United States Patent [19]

Ishimaru et al.

[11] 3,876,630

[45] Apr. 8, 1975

[54] PROCESS FOR PRODUCING PENICILLIN ESTERS

[75] Inventors: Toshiyasu Ishimaru, Suita, Osaka; Yutaka Kodama, Toyama, both of Japan

[73] Assignee: Toyama Chemical Co., Ltd., Japan

[22] Filed: Mar. 5, 1973

[21] Appl. No.: 338,294

[30] Foreign Application Priority Data
Mar. 3, 1972 Japan.............................. 47-022033

[52] U.S. Cl................................ 260/239.1; 424/271
[51] Int. Cl....................... C07d 99/16; C07d 99/22
[58] Field of Search................................. 260/239.1

[56] References Cited
UNITED STATES PATENTS
3,249,622  5/1966  Herrling et al.................... 260/239.1

*Primary Examiner*—Nicholas S. Rizzo
*Attorney, Agent, or Firm*—Oblon, Fisher, Spivak, McClelland & Maier

[57] ABSTRACT

Penicillin esters are produced by reacting penicillin derivatives with organic sulfonylhalides and organic hydroxy compounds in the presence of an acid-binding agent.

10 Claims, No Drawings

PROCESS FOR PRODUCING PENICILLIN ESTERS

BACKGROUND OF THE INVENTION

1. Field of the Invention

This invention relates to a novel process for producing penicillin esters, and more particularly to a process for producing penicillin esters represented by the following general formula (I),

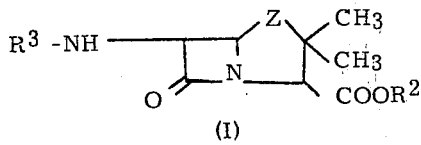

(I)

wherein Z represents S or S → O;
$R^2$ is a substituted or unsubstituted lower alkyl such as methyl, ethyl and propyl; lower alkenyl such as ethenyl, propenyl and butenyl; lower alkinyl such as ethinyl, propinyl, and butinyl; aralkyl such as benzyl and phenethyl; lower acylalkyl such as acetylmethyl, acetylethyl, and acetylpropyl; lower acylamino such as acetylamino, propionylamino and butyrylamino; lower acylaminoalkyl such as acetylaminomethyl, acetylaminoethyl and acetylaminopropyl or imino group; and $R^3$ is an acyl group.

2. Description of the Prior Art

Esterification of penicillin derivatives is sometimes required to protect the carboxyl group in the 3-position. In addition, penicillin esters are useful as starting materials for producing 7-acylamino-3-cephem-4-carboxylic acids from penicillin derivatives by a ring expansion process.

Heretofore, several processes have been used to form penicillin esters by esterification of penicillin derivatives with alcohols or phenols.

1. Penicillin salts have been reacted with haloformyl esters of alcohols or phenols in the presence of a solvent. The mixed acid anhydride obtained by this procedure is subsequently decarboxylated by treating the anhydride with a base [Chemical Abstracts 74, 22826 and 22861 (1971); and German Pat. No. 2,024,359].

2. Penicillin derivatives and alcohols have been reacted with phosgene in the presence of an acid-binding agent [Chemical Abstracts 73, 79032 (1970); and U.S. Pat. No. 3,586,667].

3. Penicillin derivatives have been reacted with alcohols in the presence of a carbodiimide as a dehydrating agent.

Processes (1) and (2) are dangerous on an industrial scale, because highly toxic phosgene must be used as a starting material. In addition, these processes are complicated, and insufficient yields of product are obtained. On the other hand, process (3) is not an industrial acceptable process because carbodiimides are extremely expensive, and the separation of the desired penicillin products from the urea by-products produced is very difficult.

A need, therefore, exists for a process for esterifying penicillin derivatives which is adequate for industrial purposes.

SUMMARY OF THE INVENTION

Accordingly, one object of this invention is to provide an improved process for the esterification of penicillin derivatives.

Another object of this invention is to provide a simple procedure for the preparation of penicillin esters in high yield.

This object and other objects of this invention as hereinafter will readily become apparent are provided by a process for producing penicillin esters which comprises reacting a penicillin derivative with an organic sulfonylhalide of the formula $R^1SO_2X$ (II), wherein $R^1$ is a substituted or unsubstituted alkyl, aryl, aralkyl, cycloalkyl or heterocyclic group and X is a halogen atom, and an organic hydroxy compound of the formula $R^2OH$ (III), wherein $R^2$ is defined as above, in the presence of an acid-binding agent.

DESCRIPTION OF THE PREFERRED EMBODIMENTS

The penicillin derivatives, which are the starting materials of the process of this invention, are represented by the following formula (IV),

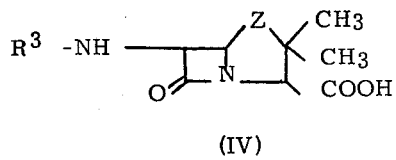

(IV)

wherein $R^3$ and Z are defined as above. Suitable $R^3$ groups include amino protective acyl groups such as formyl, cyanoacetyl, phenylacetyl, phenoxyacetyl, thienylacetyl, α-aminophenylacetyl, α-aminothienylacetyl, α-aminocyclohexadienylacetyl, 1-aminocyclohexylcarbonyl, α-aminophenylacetyl substituted with a halogen, hydroxyl, alkyl, alkoxy, nitro, or a trifluoromethyl group on a benzene ring, 3-methyl-5-phenylisooxazol-4-carbonyl, 3-methyl-5-(2-chlorophenyl) issooxazol-4-carbonyl, 3-methyl-5-(2,6-dichlorophenyl) isooxazol-4-carbonyl and tetrazorylacetyl.

The penicillins (IV) are prepared by either a fermentation process or a synthetic process. The sulfoxide derivatives thereof are obtained by oxidizing the penicillin derivatives. Preferred synthetic penicillins, include those which can provide cephalosporins having excellent antibacterial activities when the penicillin derivatives are converted to cephalosporins by a ring expansion process.

Compounds of formula (IV) suitably can be used as salts, which include metal salts such as sodium, potassium, magnesium, calcium, aluminum; and organic amine salts such as diethylamine, dibutylamine, piperidine, morpholine, pyrrolidine, triethylamine, tributylamine, N-methylpiperidine, N-methylmorpholine, or pyridine.

Suitable organic sulfonylhalides (II) which are reacted with the penicillin derivatives include alkylsulfonylhalides, arylsulfonylhalides, aralkylsulfonylhalides, cycloalkylsulfonylhalides, and heterocyclic sulfonylhalides. For economic reasons, the preferred organic sulfonylhalides are methanesulfonylchloride, trichloromethanesulfonylchloride, benzenesulfonylchloride, o- or p-toluenesulfonylchloride, p-acetamidobenzenesulfonylchloride, o- or p-chlorobenzenesulfonylchloride, p-alkoxybenzenesulfonylchloride, naphthalenesulfonylchloride, 1, 2-benzenedisulfonylchloride, 1, 3-benzenedisulfonylchloride, benzylsulfonylchloride, cyclohexylsulfonylchloride, 8- quinolinesulfonylchloride, 2-acetamidothiazole-5-sulfonylchloride.

Suitable organic hydroxy compounds (III) which are reacted with the penicillin derivatives in the presence of organic sulfonylhalides include $C_1 \sim C_4$ alcohols such as methanol, and ethanol; $C_4 \sim C_6$ t-alcohols such as t-butanol, t-pentanol, and t-hexanol; $C_5 \sim C_7$ t-alkenylalcohols such as t-pentenylalcohol; $C_5 \sim C_7$ t-alkinylalcohols such as t-pentinylalcohol; 2-iodoethanol; cyanomethanol; 2,2-dichloroethanol; 2,2-dibromoethanol, 2,2,2-trichloroethanol; 2,2,2-tribromoethanol; 4-nitrophenol; furfurylalcohol; benzylalcohol; p-bromobenzylalcohol; p-methoxybenzylalcohol; 3,5-di-t-butyl-4-hydroxybenzylalcohol; nitrobenzylalcohol; 2,4-dinitrobenzylalcohol; p-chlorobenzylalcohol; diphenylmethanol; bis(4-methoxyphenyl) methanol; bis(4-methoxyphenyl) phenylmethanol; tritylalcohol; phenacylalcohol; 4-chlorophenacylalcohol; 4-nitrophenacylalcohol; 4-methanesulfonylphenacylalcohol; N-hydroxysuccinimide; N-hydroxyphthalimide; succinimidomethanol; phthalimidomethanol; acetoneoxime; benzaldehydeoxime; acetophenoneoxime; benzophenoneoxime; furfuraloxime and cyclohexanoneoxime.

The embodiments of the process of the present invention will now be described.

Salts of the penicillin derivatives (IV) can be dissolved or suspended in an inert solvent. In this regard, organic amine salts can be prepared by dissolving or suspending a desired penicillin derivative (IV) in a solvent and then adding an organic amine thereto to produce the corresponding organic amine salt, or by suspending an alkali or alkaline earth metal salt of a penicillin (IV) in a solvent and then adding an equivalent amount of a mineral acid salt of an organic amine such as triethylamine hydrochloride or pyridine hydrochloride thereto.

Suitable inert solvent include methylene chloride, chloroform, carbon tetrachloride, ethylene chloride, acetone, methylethyl ketone, methylisobutylketone, acetonitrile, ethyl acetate, butyl acetate, methylchloroform, dioxane, tetrahydrofuran, benzene, toluene, ether, isopropyl ether. These solvents may be used independently or as a mixture of two or more solvents.

To the mixture of penicillin derivative (IV) in a solvent is added an equivalent amount or a slightly excessive amount of an organic sulfonylhalide (II) at room temperature or a lower temperature, perferably −40° to 30°C. Thereafter, an equivalent amount or a slightly excessive amount of an organic hydroxy (III) compound and an acid-binding agent are added to the solution at the same temperature in order to complete the reaction.

Suitable acid-binding agents of the process of the present invention include pyridine, picoline, lutidine, collidine, quinoline, dimethylaniline, triethylamine, tributylamine, N-methylmorpholine, N-methylpiperidine, sodium hydrogencarbonate, magnesium carbonate, calcium carbonate, ammonium carbonate, sodium acetate, and potassium acetate.

Alternatively, the organic sulfonylhalide, the organic hydroxy compound and the acid-binding agent can be simultaneously added to a solution of a salt of a penicillin derivative (IV). The order of addition of the reagents has no significance whatsoever.

The reaction mechanism of the process of the present invention has not been completely established, but is is assumed that the penicillin derivative (IV) first reacts with the organic sulfonylhalide (II) to give a mixed acid anhydride, and thereafter with organic hydroxy compound (III) to give the product with formula (I).

After the reactants have been combined in solution and the reaction completed, the reaction solution is diluted if necessary, with methylene chloride, chloroform, or ethyl acetate. The solution is then washed with water and adjusted to a pH of 7 to 8 with an inorganic or organic base such as an alkali carbonate, an alkali hydrogencarbonate, diethylamine, triethylamine, piperidine or morpholine. The organic layer is collected, washed with water, and thereafter the solvent is evaporated to produce the desired product (I) in high yield.

Thus, the foregoing description of the present invention indicates that a process for producing penicillin esters in one step which comprises reacting an organic sulfonylhalide and an organic hydroxy compound with a penicillin derivative has been achieved. In addition, since the heats of reaction are relatively small in the process of this invention, the reaction temperature may be easily controlled which renders the operation simple. Thus, an industrially useful process is provided which gives penicillin derivatives in high yield and high purity.

Having generally described this invention, a further understanding can be obtained by reference to certain specific examples which are provided herein for purpose of illustration only and are not intended to be limiting unless otherwise specified.

EXAMPLE 1

A 3.72 g quantity of the potassium salt of penicillin G was suspended in 15 ml of methylene chloride, and upon addition of 1.9 g of p-toluenesulfonylchloride at −20°C., the crystals of the salt gradually dissolved therein. After the mixture was reacted at −20°C for 30 minutes, to the mixture was added dropwise a solution of 1.48 g of 2,2,2-trichloroethanol and 0.79 g of pyridine in 3 ml of methylene chloride. After the combined mixture was reacted at −10° to 0°C for 30 minutes, the reaction solution was washed twice with water, and the pH thereof was adjusted with stirring to 7.0 with an aqueous sodium hydrogencarbonate solution. After the organic layer was washed with water, the solvent was evaporated under reduced pressure, and the residual crystals were washed with n-hexane to yield 4.32 g (93%) of white crystals of the 2,2,2-trichloroethyl ester of penicillin G having a melting point of 144° to 148° C. When recrystallized from a solvent mixture of ethyl acetate and n-hexane, white planar crystals having a melting point of 156° to 159°C were obtained.

EXAMPLE 2

A 3.89 g amount of the potassium salt of penicillin G sulfoxide was suspended in 15 ml of methylene chloride, and upon addition of 1.9 g of o-toluenesulfonylchloride thereto at −10°C., the crystals of the salt gradually dissolved therein. After the suspension was reacted at −10° to −5°C for 30 minutes, a solution of 1.48 g of 2,2,2-trichloroethanol and 0.8 g of pyridine in 5 ml of methylene chloride was slowly added dropwise thereto. After the addition of the reagents, the combined mixture was reacted at −10° to −5°C for 30 minutes. The reaction solution was washed with water, and the pH thereof was adjusted while stirred to 7.0 with an aqueous solution of sodium hydrogencarbonate. After the organic layer was washed with water, the solvent was evaporated under reduced pressure to yield pale yellow crystals. The crystals were washed with ether to yield 4.38 g (91%) of white crystals of the 2,2,2-trichloroethyl ester of penicillin G sulfoxide having a melting point of 165° to 168°C. When the crystals were recrystallized from methanol, white crystals having a melting point of 171° to 173°C were obtained.

EXAMPLE 3

The procedure of Example 1 was repeated under the same reaction conditions, except that 2.1 g of methanesulfonylchloride was used instead of p-toluenesulfonylchloride. By this procedure was produced 4.15 g (89%) of the 2,2,2-trichloroethyl ester of penicillin G.

EXAMPLE 4

The procedure of Example 1 was repeated under the same reaction conditions, except that 2.3 g of cyclohexylsulfonylchloride was used instead of p-toluenesulfonylchloride. By this procedure was produced 4.27 g (91.5%) of the 2,2,2-trichloroethyl ester of penicillin G.

EXAMPLE 5

A 3.72 g amount of the potassium salt of penicillin G was suspended in 20 ml of methylene chloride, and to the suspension was added 1.4 g of triethylamine hydrochloride at −15° to −10°C. The mixture gradually became clear. After the mixture was allowed to react at the same temperature for 15 minutes, 1.9 g of p-toluenesulfonylchloride was added to the mixture at −15° to −10°C, and the mixture was further reacted for 10 minutes. Then, to the mixture was added 2g of N-hydroxyphthalimide and 0.8 g of pyridine at the same temperature over a period of 15 minutes. After the mixture was reacted at the same temperature for an additional 30 minutes, the reaction mixture was diluted with ice water. The diluted mixture was adjusted to a pH of 7.0 with an aqueous solution of sodium hydrogencarbonate. After this organic layer was sufficiently washed with water and dried over anhydrous magnesium sulfate, the solution was concentrated to dryness under reduced pressure to yield a crude crystalline product. The crystals were washed with ether to yield 3.36 g (85%) of the phthalimido ester of penicillin G having a melting point of 182° to 185°C.

IR: $\nu$ C=O    1835, 1785, 1745, 1665cm$^{-1}$. The procedure memtioned above was repeated under the same reaction conditions, except that N-hydroxymethylphthalimide was used instead of N-hydroxyphthalimide. By this procedure was obtained the phthalimidomethylester of penicillin G.

EXAMPLE 6

A 3.72 g amount of the potassium salt of penicillin G was suspended in 20 ml of methylene chloride, and to the suspension was added 1.38 g of triethylamine hydrochloride at −15° to −10°C. The mixture gradually became clear. After the mixture was allowed to react at the same temperature for 15 minutes, 1.9 g of p-toluenesulfonylchloride was added to the mixture at −15° to −10°C and the mixture was reacted for 5 minutes. Then, to the mixture was added dropwise a solution of 1.48 g of 2,2,2-trichloroethanol and 0.79 g of pyridine in 5 ml of methylene chloride at the same temperature over a period of 15 minutes. After the mixture was reacted at the same temperature for an additional 30 minutes, the reaction mixture was diluted with ice water. The diluted mixture was adjusted at once to a pH of 7.0 with an aqueous solution of sodium hydrogencarbonate. After the organic layer was sufficiently washed with water and dried over anhydrous magnesium sulfate, the solution was concentrated to dryness under reduced pressure to yield crude, pale yellow crystals of the product. The crystals were washed with methanol to yield 4.28 g (92%) of the 2,2,2-trichloroethyl ester of penicillin G having a melting point of 154° to 158°C. When the crude crystals were recrystallized from butanol, white crystals having a melting point of 159° to 160°C were obtained.

EXAMPLE 7

The procedure of Example 6 was repeated under the same reaction conditions, except that 2.2 g of benzylsulfonylchloride was used instead of p-toluenesulfonylchloride. By this procedure was obtained 4.18 g (90%) of the 2,2,2-trichloroethyl ester of penicillin G.

EXAMPLE 8

The procedure of Example 6 was repeated under the same reaction conditions, except that 2.5 g of 8-quinolinesulfonylchloride was used instead of p-toluenesulfonylchloride. By this procedure was obtained 4.05 g (87%) of the 2,2,2-trichloroethyl ester of penicillin G.

EXAMPLE 9

A 3.88 g amount of the potassium salt of penicillin V was suspended in 20 ml of methylene chloride, and to the suspension was added 1.9 g of p-toluenesulfonylchloride at −15°C. The mixture was stirred for 15 minutes. Then, to the mixture was added dropwise a solution of 0.73 g of acetoneoxime and 0.79 g of pyridine in 5 ml of methylene chloride at −15° to −10°C. After the mixture was allowed to react at the same temperature for 30 minutes, the reaction mixture was diluted with ice water and the pH thereof was adjusted to 7.0 with an aqueous solution of sodium hydrogencarbonate. After the organic layer was sufficiently washed with water and dried over anhydrous magnesium sulfate, the solvent was evaporated under reduced pressure. A small amount of methanol was added to the residue, and the crude crystals were collected by filtration to yield 3.27 g (84%) of white crystals of the acetoneoxime ester of penicillin V having a melting point of 135° to 138°C. When the crude crystals were recrystallized from methanol, white needles of the product having a melting point of 142° to 144°C were obtained.

EXAMPLE 10

A 3.72 g amount of the potassium salt of penicillin G was suspended in 15 ml of methylene chloride, and as 1.9 g of p-toluenesulfonylchloride was added to the suspension at −15°C., the crystals of penicillin G gradually dissolved therein. After the mixture was reacted at −15°C for 30 minutes, a solution of 2.6 g of 3,5-di-t-butyl-4-hydroxybenzylalcohol and 0.8 g of pyridine in 5 ml of methylene chloride was slowly added dropwise to the reaction mixture. After the mixture was reacted at −10° to 0°C for 30 minutes, the reaction mixture was washed with water and the pH thereof was adjusted to 7.0 with an aqueous solution of sodium hydrogencarbonate. After the organic layer was sufficiently washed with water and dried over anhydrous magnesium sulfate, the solvent was evaporated under reduced pressure. The residue obtained was washed with n-hexane to yield 4.75 g (85.5%) of pale yellow crystals of the 3,-5-di-t-butyl-4-hydroxybenzyl ester of penicillin G having a melting point of 96° to 98°C.

EXAMPLE 11

A 4.04 g amount of the potassium salt of penicillin V sulfoxide was suspended in 15 ml of chloroform. To the suspension was added 1.9 g of p-toluenesulfonylchloride at −15°C, and the mixture was stirred for 30 minutes. Then, to the mixture was added dropwise a solution of 1.48 g of 2,2,2-trichloroethanol and 0.79 g of pyridine in 5 ml of methylene chloride at −15°C. After addition of the reagents, the mixture was stirred at −10°C to 0°C for 30 minutes, washed with water, and adjusted to a pH of 7.0 with an aqueous solution of sodium hydrogencarbonate. The organic layer was washed with water, dried over anhydrous magnesium sulfate, and then evaporated under reduced pressure. Ether was added to the residue, and the crystals were collected by filtration and then washed with n-hexane to yield 4.6 g (92.5%) of the 2,2,2-trichloroethylester of penicillin V sulfoxide having a melting point of 142° to 143°C. After the crystals were recrystallized from ethyl acetate-n-hexane, white crystals of the pure product having a melting point of 146° to 148°C were obtained.

EXAMPLE 12

A 5.28 g amount of 6-[D(−)-α-(2,2,2-trichloroethoxycarbonylamino) phenylacetamido] penicillanic acid sulfoxide was dissolved in 30 ml of tetrahydrofuran, and to the solution was added dropwise a solution of 1.1 g of triethylamine in methylene chloride to form the triethylamine salt. Then, to the mixture was added dropwise a solution of 1.9 g of p-toluenesulfonylchloride in methylene chloride at −15°C. After the mixture was stirred at the same temperature for 15 minutes, a solution of 1.48 g of 2,2,2-trichloroethanol and 0.8 g of pyridine in 5 ml of methylene chloride at −15° to −10°C was added dropwise to the mixture. After the mixture was reacted at −10° to 0°C for 30 minutes, the solvent was evaporated under reduced pressure and the residue was dissolved in 30 ml of methylene chloride and washed with water. The organic layer was adjusted to a pH of 7.0 with an aqueous solution of sodium hydrogencarbonate, and then washed with water and dried over anhydrous magnesium sulfate. The solvent was evaporated under reduced pressure, and the residue was washed with n-hexane to yield 5.9 g (89.5%) of the 2,2,2-trichloroethyl ester of 6-[D(−)-α-(2,2,2-trichloroethoxycarbonylamino) phenylacetamido] penicillanic acid sulfoxide having a melting point of 172° to 176°C. After the crystals were recrystallized from aqueous ethanol, white crystals of the product having a melting point of 184° to 186°C were obtained.

EXAMPLE 13

A 3.72 g amount of the potassium salt of penicillin G was suspended in 15 ml of methylene chloride, and to the suspension was added 2.1 g of p-toluenesulfonylchloride in 4 ml of methylene chloride at −15° ± 2°C. After the mixture was allowed to react at the same temperature for 10 minutes, a solution of 1.36 g of phenacylalcohol and 0.95 g of pyridine in 2 ml of methylene chloride at −15° ± 2°C was added dropwise to the mixture over a period of 40 minutes. The mixture was allowed to react at the same temperature for an additional 30 minutes. The reaction mixture was washed with water and with an aqueous solution of sodium hydrogencarbonate, and then dried over anhydrous magnesium sulfate. The solvent was evaporated under reduced pressure, and the residue was washed with ether to yield 3.7 g (81%) of white crystals of the phenacyl ester of penicillin G having a melting point of 133°C.

Having now fully described this invention, it will be apparent to one of ordinary skill in the art that many changes and modifications can be made thereto without departing from the spirit or scope of the invention as set forth herein.

What is claimed is:

1. A process for producing penicillin esters of the following formula:

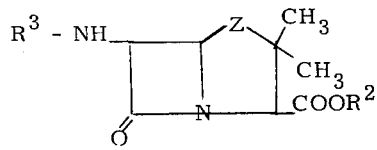

wherein Z is S or S → O; $R^2$ is halo substituted lower alkyl, phenyl carbonyl lower alkyl, 3, 5-di-butyl-4-hydroxybenzyl, lower alkylideneimino, phthalimido or phthalimido lower alkyl; and $R^3$ is phenyl lower alkanoyl, phenoxy lower alkanoyl or α-amino-phenyl lower alkanoyl wherein the α-amino-group is protected with an alkoxy carbonyl group, which comprises reacting a penicillin having the formula:

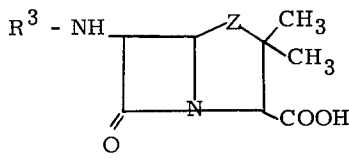

wherein $R^3$ and Z are defined as above, with an organic sulfonyl halide selected from the group consisting of methanesulfonylhalide, trichloromethanesulfonylhalide, benzenesulfonylhalide, o- or p-toluenesulfonylhalide, p-acetamidobenzenesulfonylhalide, o- or p-chlorobenzenesulfonylhalide, p-loweralkyloxybenzenesulfonylhalide, naphthalenesulfonylhalide, benzylsulfonylhalide, cyclohexylsulfonylhalide, 8-quinolinesulfonylhalide and 2-acetamidothiazole-5-sulfonylhalide, and an organic hydroxy compound of the formula $R^2OH$, wherein $R^2$ is defined as above in the presence of an acid binding agent selected from the group consisting of pyridine, picoline, lutidine, collidine, quinoline, diloweralkylaniline, triloweralkylamine, N-loweralkylmorpholine, N-loweralkylpiperidine, sodium hydrogencarbonate, magnesium carbonate, calcium carbonate, ammonium carbonate, sodium acetate and potassium acetate.

2. The process of claim 1, wherein $R^3$ is selected from the group consisting of phenylacetyl, phenoxyacetyl and 6-[D(−)-α(2,2,2-trichloroethoxycarbonylamino)-phenylacetyl].

3. The process of claim 1, wherein the organic hydroxy compound is selected from the group consisting of 2,2,2-trichloroethanol, N-hydroxyphthalimide, acetone oxime, 3,5-di-t-butyl-4-hydroxybenzylalcohol and phenylacyl alcohol.

4. The process of claim 1, wherein the penicillin is reacted with the organic sulfonyl halide and the organic hydroxy compound in the presence of an inert solvent selected from the group consisting of methylene chloride, chloroform, carbon tetrachloride, ethylene chloride, acetone, methylethyl ketone, methylisobutylketone, acetonitrile, ethyl acetate, butyl acetate, methylchloroform, dioxane, tetrahydrofuran, benzene, toluene, ether, isopropyl ether and mixtures thereof.

5. The process of claim 1, which further comprises diluting the reaction solution, after the reaction is complete, with methylene chloride, chloroform, or ethyl acetate, washing the reaction solution with water and adjusting the pH to 7 to 8 with a base selected from the group consisting of alkali carbonate, alkali hydrogen carbonate, diethylamine, triethylamine, piperidine and morpholine.

6. The process of claim 1, wherein the penicillin is first reacted with the organic sulfonyl halide and then the resulting reaction product is reacted with the organic hydroxy compound.

7. The process of claim 1, wherein a salt of the penicillin compound is used, said salt is selected from the group consisting of sodium, potassium, magnesium, calcium, aluminum; and organic amine salts of diethylamine, dibutylamine, piperidine, morpholine, pyrrolidine, triethylamine, tributylamine, N-methylpiperidine, N-methylmorpholine and pyridine.

8. The process according to claim 1, wherein said organic sulfonylhalide is toluenesulfonylchloride.

9. The process according to claim 1, wherein said acid-binding agent is pyridine.

10. The process according to claim 1, wherein said reaction is conducted at a temperature of 40° to 30°C.

* * * * *